United States Patent
Cahill

(10) Patent No.: US 8,978,834 B2
(45) Date of Patent: Mar. 17, 2015

(54) SYSTEM AND METHOD OF DETERMINING A STATUS OF A BRAKE ASSEMBLY

(71) Applicant: Eric Daniel Cahill, Troy, OH (US)

(72) Inventor: Eric Daniel Cahill, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 8 days.

(21) Appl. No.: 13/650,838

(22) Filed: Oct. 12, 2012

(65) Prior Publication Data
US 2014/0102836 A1 Apr. 17, 2014

(51) Int. Cl.
*B60T 17/22* (2006.01)
*B60T 7/04* (2006.01)
*B60T 13/66* (2006.01)
*B60T 13/74* (2006.01)

(52) U.S. Cl.
CPC ............... *B60T 7/042* (2013.01); *B60T 13/662* (2013.01); *B60T 13/74* (2013.01); *B60T 17/22* (2013.01)
USPC ................ 188/1.11 R; 188/1.11 E; 188/72.8; 188/156

(58) Field of Classification Search
USPC .......... 188/1.11 R, 1.11 L, 1.11 E, 71.7, 72.8, 188/73.1, 79.51, 156–159, 195
See application file for complete search history.

(56) References Cited

U.S. PATENT DOCUMENTS

| | | | |
|---|---|---|---|
| 4,578,993 A | 4/1986 | Burandt | |
| 4,603,594 A | 8/1986 | Grimm | |
| 6,249,737 B1 | 6/2001 | Zipp | |
| 6,402,259 B2 | 6/2002 | Corio et al. | |
| 6,471,015 B1 | 10/2002 | Ralea et al. | |
| 6,847,869 B2 | 1/2005 | Dewberry et al. | |
| 6,929,333 B2 | 8/2005 | DeVlieg | |
| 7,448,701 B2 | 11/2008 | Nilsson et al. | |
| 7,565,953 B2 | 7/2009 | Dalton et al. | |
| 8,123,161 B1 | 2/2012 | Collins | |
| 8,177,308 B2 | 5/2012 | Ralea | |
| 8,489,302 B2* | 7/2013 | Cahill | 701/76 |
| 2005/0269872 A1* | 12/2005 | Ralea | 303/20 |
| 2007/0052289 A1 | 3/2007 | Nilsson et al. | |
| 2009/0266652 A1 | 10/2009 | Dalton et al. | |
| 2010/0090058 A1 | 4/2010 | Cahill et al. | |
| 2011/0153176 A1 | 6/2011 | Cahill | |

OTHER PUBLICATIONS

Extended European Search Report for EP Application No. 13187688.0-1756, dated Feb. 19, 2014, pp. 1-5.

* cited by examiner

*Primary Examiner* — Pamela Rodriguez
(74) *Attorney, Agent, or Firm* — Cantor Colburn LLP

(57) ABSTRACT

A method of determining a status of a brake actuator of a brake assembly includes sensing one or more activations of the brake actuator, storing the one or more activations in a computer memory, sensing a depth of a parameter of the one or more activations, storing the depth of the parameter of the one or more activations in the computer memory, and determining a status of the brake actuator based on the depth of the parameter of the one or more activations.

15 Claims, 3 Drawing Sheets

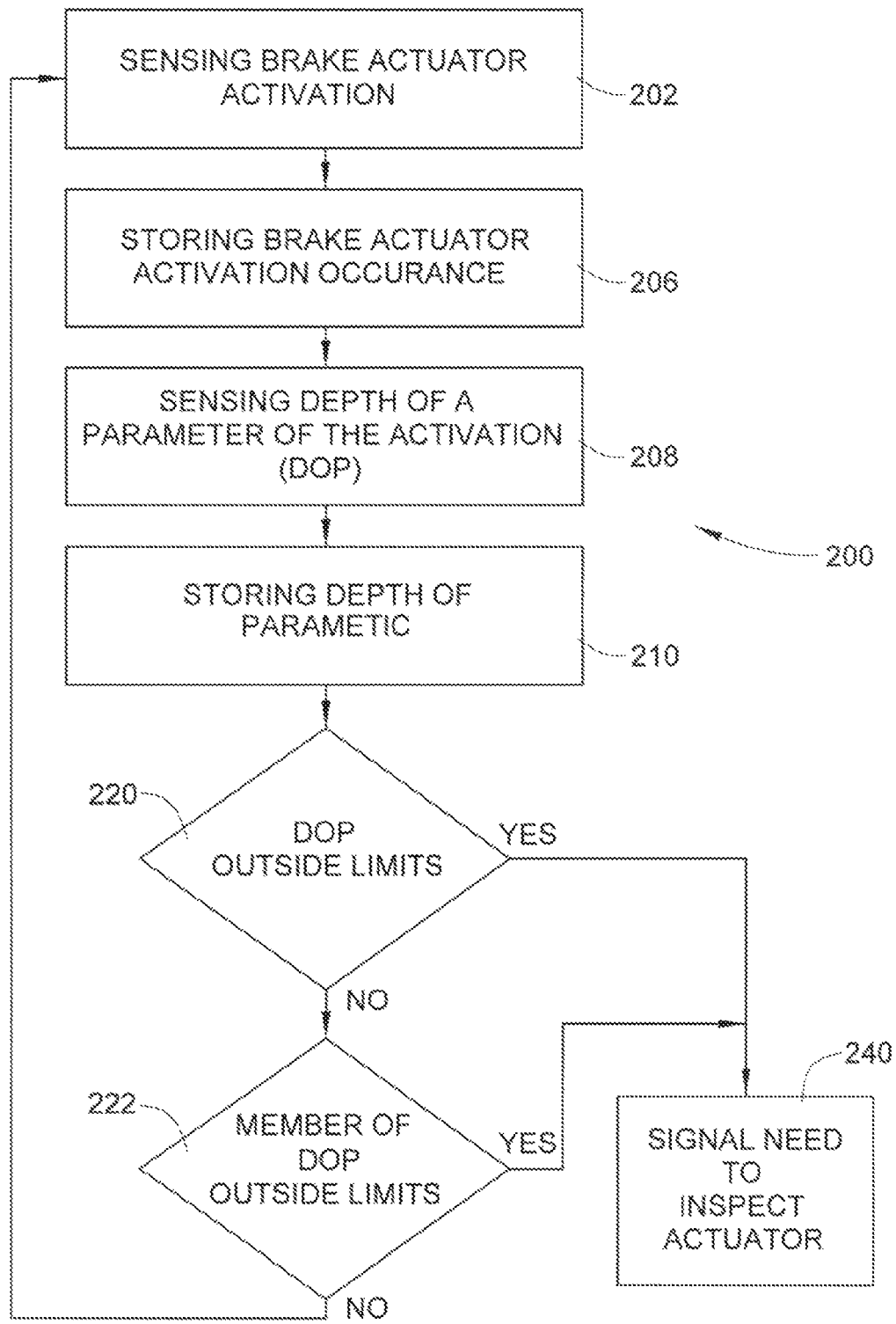

SYSTEM AND METHOD OF DETERMINING A STATUS OF A BRAKE ASSEMBLY

BACKGROUND OF THE INVENTION

Exemplary embodiments pertain to the art of brake systems and, more particularly, to a system and method of analyzing a life cycle of a brake assembly.

Braking systems are employed in a wide range of vehicles and industrial applications. In many cases, a braking system includes an actuator that acts upon a braking element. The actuator may be mechanical, electrical, hydraulic or a combination thereof. In the case of a hydraulic actuator, a fluid acts upon a piston which, in turn, is connected to an actuator member. The actuator member acts upon the braking element with a prescribed force that is developed through an interaction between the fluid and the piston. Over time, the actuator wears and is no longer able to deliver an actuation stroke having the prescribed force. A worn actuator is typically repaired and or replaced to restore the braking system.

BRIEF DESCRIPTION OF THE INVENTION

Disclosed is a method of determining a status of a brake assembly. The method includes sensing one or more activations of the brake actuator, storing the one or more activations in a computer memory, sensing a depth of a parameter of the one or more activations, storing the depth of the parameter of the one or more activations in the computer memory, and determining a status of the brake actuator based on the depth of the parameter of the one or more activations.

Also disclosed is a braking system including a support plate, and one or more brake actuation members mounted to the support plate. Each of the one or more brake actuation members includes a gear member. One or more brake actuators is mounted to the support plate. Each of the one or more brake actuators includes an actuator plate configured and disposed to act upon the gear member. A sensor is mounted to each of the one or more brake actuation members. The sensor is configured and disposed to detect one or more activations of the one or more brake actuation members and a depth of a parameter of each of the one or more activations. A controller is operatively connected to the sensor. The controller is configured and disposed to determine a status of the brake actuator based on the depth of the parameter of the one or more activations.

BRIEF DESCRIPTION OF THE DRAWINGS

The following descriptions should not be considered limiting in any way. With reference to the accompanying drawings, like elements are numbered alike:

FIG. 3 is a flow chart depicting a method of determining a status of the brake assembly of FIG. 1.

DETAILED DESCRIPTION OF THE INVENTION

Figure 1:
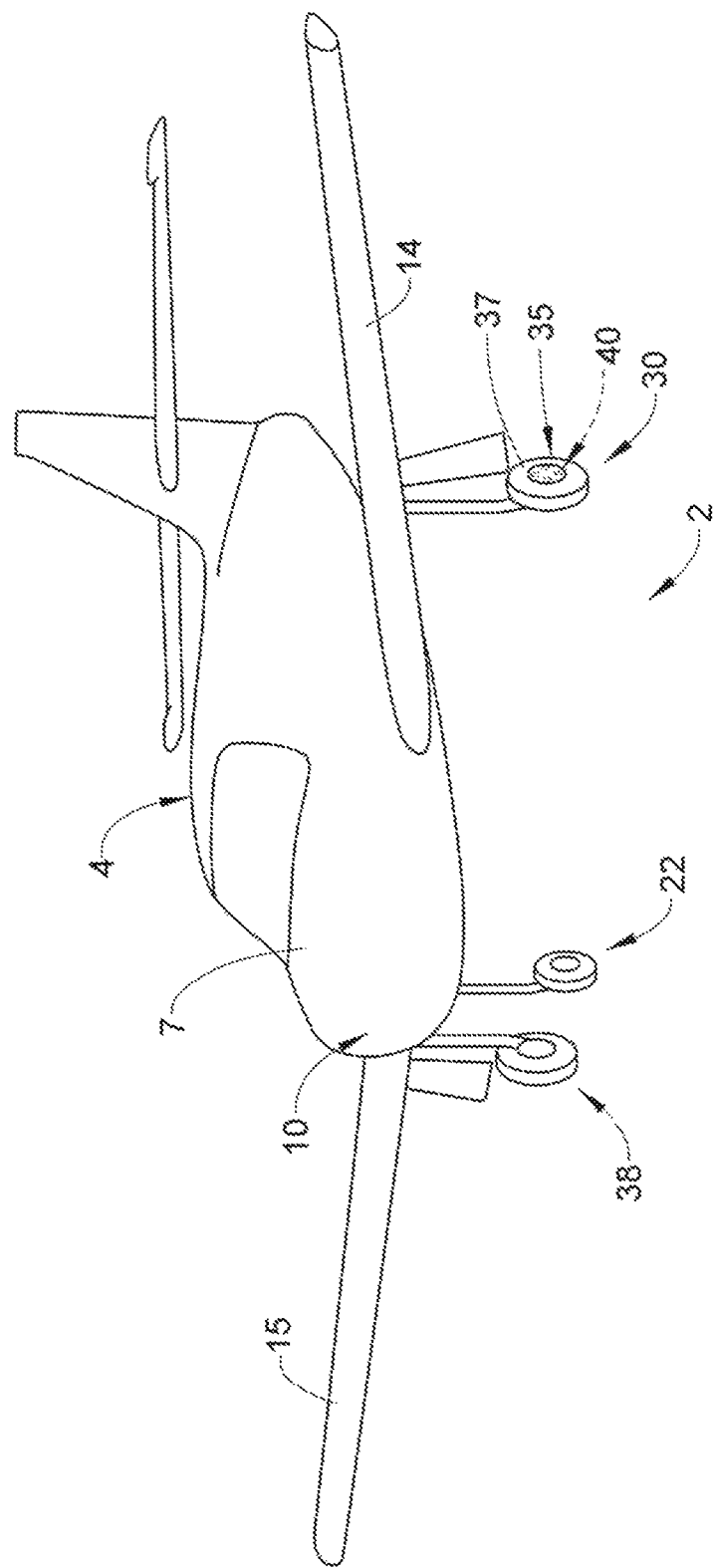
FIG. 1 is a partial perspective view of an aircraft including a system for determining a status of a brake assembly in accordance with an exemplary embodiment.

A detailed description of one or more embodiments of the disclosed apparatus and method are presented herein by way of exemplification and not limitation with reference to the Figures.

A vehicle in accordance with an exemplary embodiment is indicated generally at 2. Vehicle 2 is shown in the form of an aircraft 4. It should however be understood that vehicle 2 may take on other forms. Aircraft 4 includes a fuselage 7 including a nose section 10 and a tail section (not shown). Aircraft 4 also includes a first wing 14 extending from a first side of fuselage 7 and a second wing 15 extending from an opposite of fuselage 7. Aircraft 4 is shown to include a forward landing gear 22 arranged near nose section 10 as well as aft landing gear 30 mounted to first wing 14. Landing gear 30 includes a wheel 35 that supports a tire 37. It should be understood that second wing 15 also includes landing gear 38. In accordance with an exemplary embodiment, landing gear 30 includes a braking system 40 mounted to wheel 35. Braking system 40 may also be provided on aft landing gear 30 as well as the landing gear provided on second wing 15.

Figure 2:
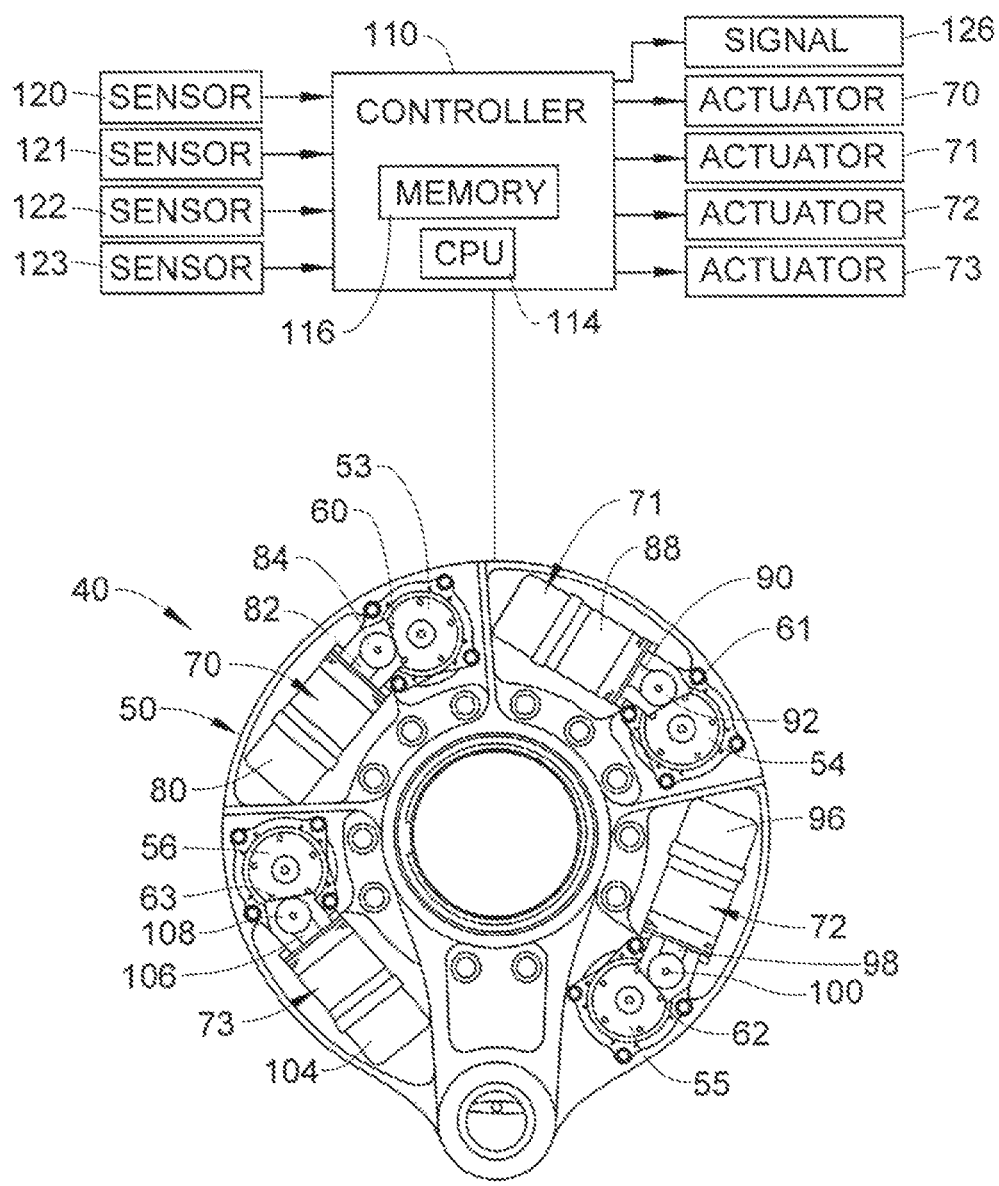
FIG. 2 is a partial plan view of a brake assembly of FIG. 1.

As shown in FIG. 2, braking system 40 includes a support plate 50 having mounted thereto a first brake actuation member 53, a second brake actuation member 54, a third brake actuation member 55 and a fourth brake actuation member 56. First brake actuation member 53 includes a first gear member 60, second brake actuation member 54 includes a second gear member 61, third brake actuation member 55 includes a third gear member 62, and fourth brake actuation member 56 includes a fourth gear member 63. Braking system 40 also includes a first brake actuator 70, a second brake actuator 71, a third brake actuator 72, and a fourth brake actuator 73. As will be detailed more fully below, brake actuators 70-73 act upon corresponding ones of gear members 60-63 causing brake actuation members 53-56 to act upon braking elements (not shown). The braking elements apply a frictional force to braking members (also not shown) on wheel 35 (FIG. 1). The frictional force causes rotation of wheel 35 to slow bringing aircraft 4 to a stop.

Brake actuator 70 includes a coil assembly 80 that acts upon a screw element 82 that drives an actuator plate or gear element 84. Similarly, brake actuator 71 includes a coil assembly 88 that acts upon a screw element 90 that drives an actuator plate or gear element 92. Brake actuator 72 includes a coil assembly 96 that acts upon a screw element 98 which, in turn, drives an actuator plate or gear element 100. Brake actuator 73 includes a coil assembly 104 that acts upon a screw element 106 that drives an actuator plate or gear element 108. Thus, in accordance with an aspect of an exemplary embodiment, brake actuators 70-73 take the form of electromechanical actuators or EMAs. With this arrangement, application of an electric current to coil assemblies 80, 88, 96, and 104 causes respective ones of screw elements 82, 90, 98, and 106 to drive gear elements 84, 92, 100, and 108 against corresponding ones of gear members 60-63 leading to a brake activation.

In accordance with an exemplary embodiment, braking system 40 includes a controller 110 operatively connected to braking actuators 70-73. Controller 110 includes a central processing unit (CPU) 114 and a memory 116. Braking system 40 also includes a first sensor 120, a second sensor 121, a third sensor 122, and a fourth sensor 123. Sensors 120-123 are linked to controller 110 and operatively associated with respective ones of braking actuators 70-73. In accordance with an aspect of the exemplary embodiment, sensors 120-123 take the form of electrical sensors, such as current sensors that detect an amount of application current delivered to each coil assembly 80, 88, 96, and 104. However, sensors 120-123 may take on other forms as will be detailed below. Sensors 120-123 signal an activation occurrence and an activation parameter to controller 110. Controller 110 determines a depth of an actuation parameter based in the application current.

For example, based on the application current, controller 110 may determine an amount of force needed to drive each screw element 82, 90, 98, and 106 for a particular brake activation. In accordance with another aspect of an exemplary embodiment, sensors 120-123 may take the form of load cells that provide the depth of an activation parameter, e.g., application force, to controller 110. Controller 110 may also receive input from current sensors, load sensors and other sensor (not shown) that provide a depth of activation parameter. Based on the depth of the activation parameter, controller 110 may then determine a status of each braking actuator 70-73. More specifically, controller 110 can determine whether one or more of braking actuators 70-73 is nearing or at an end of operational life based on a number of sensed actuation occurrences and the depth of the activation. Controller 110 may then provide an output signal 126 indicating a need to inspect, maintain, and/or replace one or more of braking actuators 70-73.

At this point reference will follow to FIG. 3 in describing a method 200 of determining a status of braking actuators 70-73. Controller 110 senses a brake actuator activation as indicated in block 202. The occurrence of a brake activation is then stored in memory 116 as indicated in block 206. Controller 110 also senses a depth of a parameter (DOP) of the activation, such as the force needed to drive each screw element 82, 90, 98, and 106 as shown in block 208. The DOP is stored in memory 116 as indicated at block 210. At this point, controller 110 determines whether the DOP is outside a prescribed limit as indicated in block 220. Controller 110 can, for example, compare the amount of force needed to drive one or more screw elements 82, 90, 98, and/or 106 against values stored in an activation threshold database stored in memory 116. Controller 110 can then determine whether the force may have exceeded or nearly exceeded a threshold value for the corresponding one of brake actuators 70-73.

If the DOP is not outside the prescribed parameter, controller 110 compares the number of activation occurrences and associated DOPs against values stored in the activation threshold database in memory 116 at block 222. If the number of activation occurrences and associated DOPs is within prescribed limits, no action is taken. If, however, the DOP itself, as determined in block 220, or the number of activations and associated DOPs, as determined in block 222, is outside of prescribed limits, controller 110 presents signal 126 indicating the need for a brake actuator inspection, maintenance, and/or replacement, as determined in block 240.

A typical DOP for a brake actuator is around 10,000 pounds (4,536 kilograms). A brake actuator may be able to withstand an unlimited number of activations having a low DOP, for example, a DOP around 2,000 pounds (907 kilograms). A brake actuator that perceives a DOP of about 8,000 pounds (3,629 kilograms) during 100 activation occurrences may warrant inspection, maintenance and/or replacement. A brake actuator that perceives a single DOP of about 12,000 pounds (5,443 kilograms) may also warrant inspection, maintenance and/or replacement. Accordingly, the exemplary embodiments provide a system for determining when a brake actuator may require inspection, maintenance, and/or replacement. Of course it should be understood that the above values are provided for exemplary purposes and should not be considered as limiting the scope of the exemplary embodiment. At this point it should be understood that while described in terms of being associated with an aircraft, the braking system, in accordance with the exemplary embodiment, may be applicable across a wide range of vehicle types. Also, while described in connection with electro-mechanical actuators, the exemplary embodiments may also be employed with brake actuators of various types. Also, while the sensors are described as being current sensors and/or load cells, it should be understood that other sensors that can determine a depth of parameter of activation such as displacement sensors, strain gauges and the like may also be employed.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment or embodiments disclosed as the best mode contemplated for carrying out this invention, but that the invention will include all embodiments falling within the scope of the claims.

What is claimed is:

1. A method of determining a status of a brake assembly, the method comprising:
sensing one or more activations of the brake actuator;
storing the one or more activations in a computer memory;
sensing a depth of a parameter of the one or more activations;
storing the depth of the parameter of the one or more activations in the computer memory; and
determining an operational life status of the brake actuator based on the depth of the parameter of the one or more activations.

2. The method according to claim 1, wherein sensing the depth of the parameter of the one or more activations includes detecting a force applied by the brake actuator.

3. The method according to claim 2, wherein detecting the force applied by the brake actuator includes sensing force at a load cell mounted at the brake actuator.

4. The method according to claim 2, wherein detecting the force applied by the brake actuator includes sensing electrical current passed to the brake actuator.

5. The method according to claim 1, wherein determining the operational life status of the brake actuator includes comparing the parameter of the one or more activations to an activation threshold database.

6. The method according to claim 1, further comprising:
sensing one or more activations of an additional brake actuator associated with the brake assembly;
storing the one or more activations of the additional brake actuator in the computer memory;
sensing a depth of a parameter of the one or more activations of the additional brake actuator;
storing the depth of the parameter of the one or more activations of the additional brake actuator in the computer memory; and
determining an operational life status of the additional brake actuator based on the depth of the parameter of the one or more activations.

7. The method of claim 1, wherein determining an operational life status of the brake actuator includes determining whether the brake actuator needs inspection.

8. A braking system comprising:
a support plate;
one or more brake actuation members mounted to the support plate, each of the one or more brake actuation members including a gear member;

one or more brake actuators mounted to the support plate, each of the one or more brake actuators including an actuator plate configured and disposed to act upon the gear member;

a sensor mounted to each of the one or more brake actuation members, the sensor being configured and disposed to detect one or more activations of the one or more brake actuation members and a depth of a parameter of each of the one or more activations; and a controller operatively connected to each sensor, the controller being configured and disposed to determine an operational life status of the one or more brake actuators based on the depth of the parameter of the one or more activations.

9. The braking system according to claim 8, wherein the sensor comprises a load cell.

10. The braking system according to claim 9, wherein the load cell is configured and disposed to detect a force associated with the one or more activations of the one or more brake actuators.

11. The braking system according to claim 8, wherein the one or more braking actuators comprise electro-mechanical actuators.

12. The braking system according to claim 11, wherein the sensor comprises a current sensor.

13. The braking system according to claim 12, wherein the current sensor is configured and disposed to detect a current draw of the one or more brake actuators.

14. The braking system according to claim 13, wherein the controller is configured and disposed to detect a load of the one or more activations of the one or more brake actuators based on the current draw.

15. The braking system according to claim 8, wherein the braking system is part of an aircraft.

* * * * *